US005662224A

United States Patent [19]

Nogues

[11] Patent Number: 5,662,224

[45] Date of Patent: Sep. 2, 1997

[54] CONTAINER WITH TIME INDICATOR

[76] Inventor: Nelson E. Nogues, 3115 NW. 96 St., Miami, Fla. 33147

[21] Appl. No.: 767,930

[22] Filed: Dec. 17, 1996

[51] Int. Cl.[6] .......... B64D 83/04

[52] U.S. Cl. .......... 206/534; 215/230

[58] Field of Search .......... 206/534, 459.5, 206/459.1; 215/230; 116/306, 307, 308, 309

[56] References Cited

U.S. PATENT DOCUMENTS

| | | | |
|---|---|---|---|
| 4,238,033 | 12/1980 | Artzt . | |
| 5,114,374 | 5/1992 | Estiva | 215/230 X |
| 5,358,117 | 10/1994 | Adams . | |
| 5,586,087 | 12/1996 | Silverson | 215/230 X |

*Primary Examiner*—Jacob K. Ackun
*Attorney, Agent, or Firm*—J. Sanchelima

[57] ABSTRACT

An improvement for containers for medicaments that have to be ingested or applied periodically during the day or night and these containers include a neck connecting the body of a container. A ring with markings is snugly mounted to the neck so that it can be selectively positioned to make one of the markings coincide with one of two reference marking members. One of the two reference marking members is selectively covered with one pad member. The pad member is mounted to the reference marking assembly and it is foldable so that a user can selectively cover one of the reference marking members.

5 Claims, 2 Drawing Sheets

CONTAINER WITH TIME INDICATOR

BACKGROUND OF THE INVENTION

1. Field of the Invention

The present invention relates to a container with a time indicator assembly to alert the user to the next scheduled medication.

2. Description of the Related Art

Applicant believes that the closest reference corresponds to U.S. Pat. No. 4,238,033 issued to Artzt in 1980 for a Receptacle For Medication. However, it differs from the present invention because Artzt's device has to include a lid engageable with a rim for closing the opening of a container, and the present invention discloses a ring removably and rotatably mounted to the neck of a conventional container. The present invention is compatible with most designs of existing containers.

Another reference corresponds to U.S. Pat. No. 5,358,117 issued to Adams in 1994 for a Medicine Container Cap With Time Indicator. Adams' patented device teaches a closure cap with a scale on the top thereof and an arm member rotatably mounted to indicate the next time for taking the medicine dosage. The present invention discloses two arrow marks located at both opposite sides of the walls of a medicine container for selectively pointing a numeral in a scale located in the rotatable ring.

Neither of the above mentioned patents teach a feature that shows the time (day or night) the medication should be taken, they only show a scale from 1 to 2 hours.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a time indicator assembly rotatably mounted to a medicine container that permits a user to set the time for next medication at prescribed intervals of time.

It is another object of this invention to provide a time indicator assembly that includes signs, such as arrow marks, to select the time between AM and PM.

It is still another object of the present invention to provide a time indicator assembly that is easy to mount on the neck of a container, such as the ones used to store medicaments.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
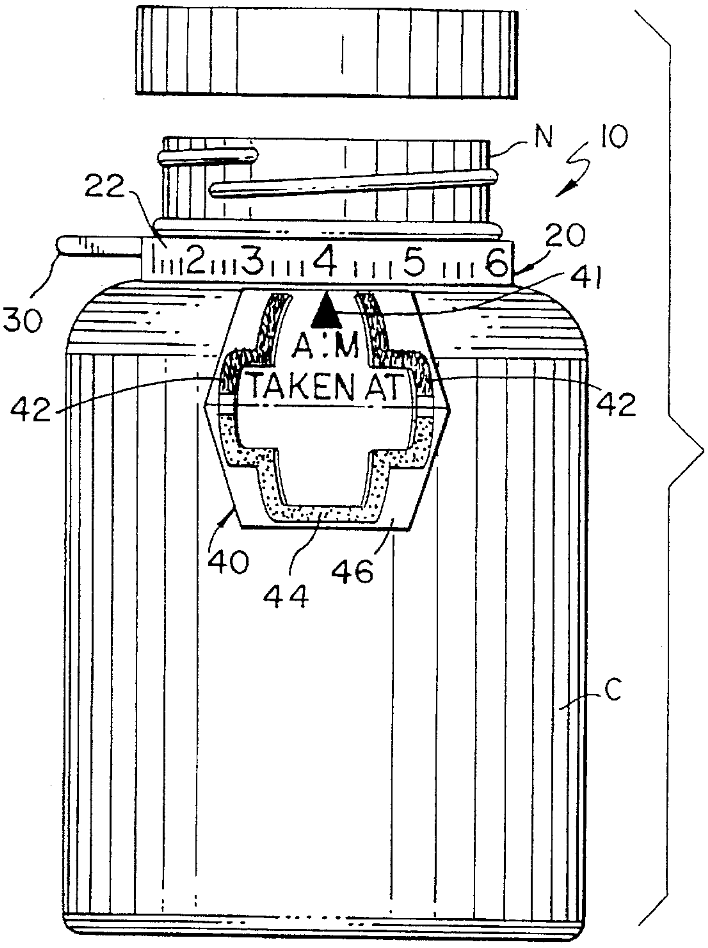
FIG. 1 is an elevational view of a container with the time indicator assembly mounted thereto.
Figure 2:
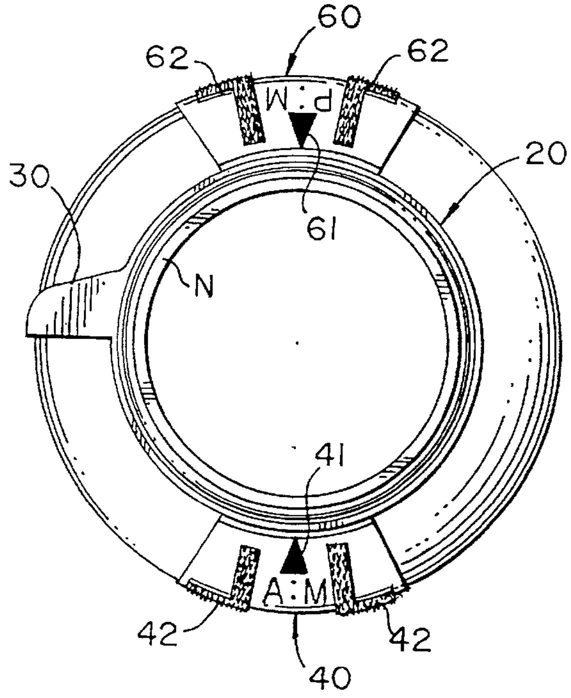
FIG. 2 is a top view of the previous figure but without the closure member.
Figure 3:
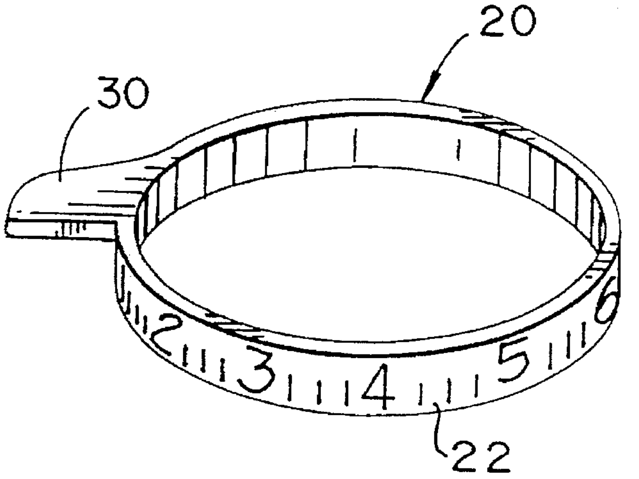
FIG. 3 is an isometric view of the time indicator assembly.
Figure 4:
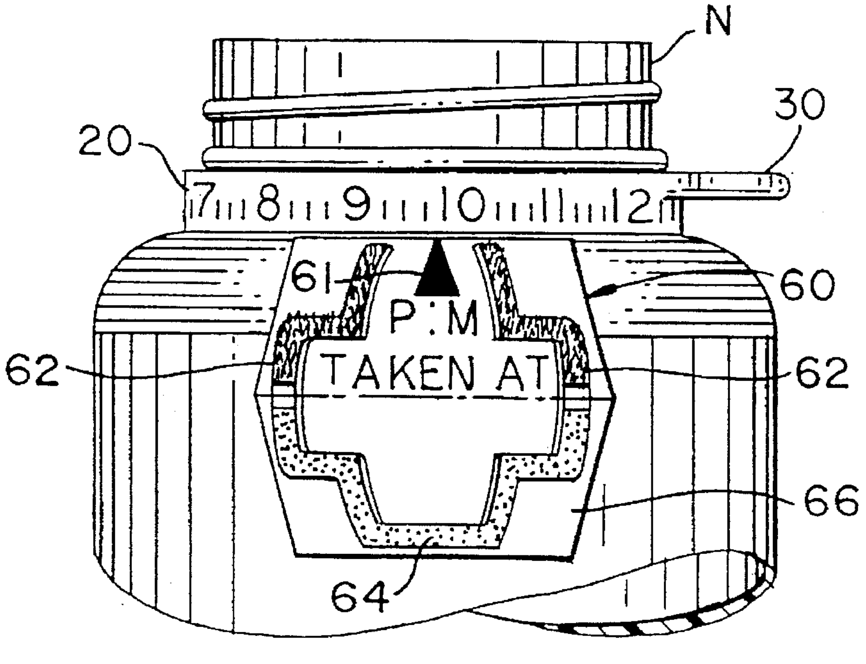
FIG. 4 is a partial elevational view of the opposite side of this invention shown in FIG. 1.

The present invention is an improved container 10 with a time indicator assembly that includes ring member 20 that is rotatably mounted to neck N of container C. The body of the typical medicine container has a diameter that is larger than the neck's diameter. Reference markings 40 and 60 are cooperatively located on the container incorporating the present invention, adjacent to ring member 20. Reference markings 40 and 60 represent AM and PM. Ring member 20 includes markings 22 representing time references, such as hours. In the preferred embodiment, ring member 20 includes twelve markings 22 representing the twelve hours of one half of a day.

Ring member 20 is snugly mounted to neck N of container C so that, to rotate it, a user applies a predetermined force on actuator member 30 which is rigidly mounted to ring member 20. Member 30 provides a suitable contact area that allows a user to apply the necessary force to cause a desired marking 22 to be positioned next to either reference marking assemblies 40 or 60 mounted to container C. A user covers the other reference marking thus providing a reminder of the hour (AM or PM) when the medicament was taken or applied. Preferably, the uncovered reference marking assembly (40 or 60) represents the time at which the user took his medication, but it could be the time when the next medication is due.

Marking assemblies 40 and 60, in the preferred embodiment, include flexible pad members 46 and 66 having each mating hook and loop pieces 42; 44; 62 and 64 that permit a user to fold pad members 46 or 66 to cover selectively cover marking elements 41 and 61. Instead of being a unitary foldable pad member 46 or 66, separate completely detachable pad can also be used but the risk of misplacing it justifies using a foldable pad member.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. In a container that includes a neck with a circular cross-section and having first and second ends, said first end includes an opening, and a container body having a larger diameter than the diameter of said neck, said container body being connected to said second end, the improvement comprising:

A) a ring member rotatably mounted on said neck adjacent to said second end and said ring member having a plurality of markings along its periphery; and B) two reference marking assemblies mounted on said container substantially adjacent to said ring member, each of said marking assembly including a reference member, and including each a foldable pad member with means for selectively covering said reference member.

2. The improvement set forth in claim 1 wherein said reference markings and said pad member include mating hook and loop fastening means for removably mounting said pad member over one of said two reference markings to selectively cover one of them.

3. The improvement set forth in claim 2 wherein said ring member includes an actuator member rigidly and outwardly mounted thereon so that the rotation of said ring member is facilitated.

4. The improvement set forth in claim 3 wherein said markings on the periphery of said ring member include twelve equidistant markings and one of said marking references represent AM, and the other marking reference represents PM.

5. The improvement set forth in claim 4 wherein said ring member fits snugly over said neck.

* * * * *